Patented Sept. 13, 1932

1,877,203

UNITED STATES PATENT OFFICE

WALTER SCHOELLER, OF BERLIN-WESTEND, HANS JORDAN, OF BERLIN-STEGLITZ, AND WALTER LINDE, OF BERLIN, GERMANY, ASSIGNORS TO THE FIRM SCHERING-KAHLBAUM A-G., OF BERLIN, GERMANY

METHOD OF SIMULTANEOUS HYDROGENATION AND DEHYDROGENATION

No Drawing. Application filed April 6, 1929, Serial No. 353,255, and in Germany April 21, 1928.

Our invention refers to the carrying out of chemical reactions and more especially to the introduction of hydrogen in and removal from chemical compounds, this process being commonly known as hydrogenation and dehydrogenation, respectively.

It is an object of our invention to provide means whereby hydrogenation and dehydrogenation can be effected within the same reaction.

It is well known to those skilled in the art that hydrogen can be introduced in substances capable of combining with it by treating the substance with molecular hydrogen in the presence of a catalyst. We have now found that there can be used for the same purpose instead of molecular hydrogen also compounds containing hydrogen, preferably such compounds, the molecule of which contains great quantities of hydrogen. Such compounds are for instance cyclohexanol and its homologues.

If, according to the present invention, for instance 2 mols. cyclohexanol and 1 mol. phenol are caused to react with each other at about 200° C. in the presence of a hydrogenation catalyst, cyclohexanon will be formed, the hydrogen liberated from the cyclohexanol hydrogenating the phenol. Under the above mentioned conditions such hydrogenation will proceed only until a stable ketone is formed.

We thus succeed in recovering in a single reaction the cyclic ketones, which could hitherto be produced only by means of a sequence of reactions.

The reaction above mentioned includes in reality two coupled reactions, a hydrogenation and a dehydrogenation, which occur simultaneously. According as the reacting substances are chosen either the hydrogenation or the dehydrogenation or both may be particularly useful.

In the same manner we also succeed in bringing to reaction substances, which could be hydrogenated with molecular hydrogen only with great difficulties. We have found such a substance to be for instance carbon monoxide.

The new process can easily be rendered continuous if care is taken that the products of reaction resulting in the hydrogenation of carbon monoxide are removed in such manner as not to disturb the equilibrium of reaction and without the liquid serving as solvent in the hydrogenation being lost, while at the same time sufficient carbon monoxide and hydrogen are continuously introduced into the reaction vessel.

Example 1

2 mols. cyclohexanol and 1 mol. phenol are heated under stirring in a pressure vessel to about 200° C. in the presence of about 5% of their total weight of a hydrogenation catalyst. The starting of the reaction is indicated by a sudden rise of pressure which is followed after some time by a drop of pressure.

After the lapse of a few hours the reaction is interrupted, the products are separated from the catalyst and the cyclohexanon obtained substantially in the calculated quantity is isolated.

Example 2

2 mols. isoborneol and 1 mol. phenol are treated as described with reference to example 1. The reaction takes about the same course. After a few hours, the reaction mass is separated from the catalyst and after cooling the camphor, which has formed in the reaction, is separated from the cyclohexanon by centrifuging.

Example 3

Into an autoclave containing isoborneol and about 5% by weight of a hydrogenation catalyst is forced carbon monoxide and the contents are heated under vigorous stirring to about 200° C. After about three hours continuous heating the methyl alcohol, which has formed in the reaction is removed by distillation and the camphor purified in a well known manner.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

We claim:—

1. The method of producing a cyclic ketone, comprising acting under increased pressure with a saturated cyclic alcohol on phenol in the presence of a hydrogenation catalyst and at a temperature of about 200° C.

2. The method of producing cyclo hexanon, comprising acting under increased pressure with 2 mols. cyclo hexanol on 1 mol. phenol in the presence of a hydrogenation catalyst and at a temperature of about 200° C.

3. The method of producing cyclo hexanon and camphor, comprising acting under increased pressure with 1 mol. phenol on 2 mols. isoborneol in the presence of a hydrogenation catalyst and at a temperature of about 200° C.

In testimony whereof we affix our signatures.

WALTER SCHOELLER.
HANS JORDAN.
WALTER LINDE.